United States Patent
Schumacher

(10) Patent No.: US 7,151,718 B2
(45) Date of Patent: Dec. 19, 2006

(54) MEDIA STORAGE SYSTEM

(76) Inventor: Alain Schumacher, 6, rue de la Foret Verte, Heisdorf (LU) L-7340

( * ) Notice: Subject to any disclaimer, the term of this patent is extended or adjusted under 35 U.S.C. 154(b) by 306 days.

(21) Appl. No.: 10/490,784

(22) PCT Filed: Apr. 5, 2002

(86) PCT No.: PCT/EP02/03852

§ 371 (c)(1),
(2), (4) Date: Sep. 20, 2004

(87) PCT Pub. No.: WO03/085663

PCT Pub. Date: Oct. 16, 2003

(65) Prior Publication Data

US 2005/0024996 A1    Feb. 3, 2005

(51) Int. Cl.
*G11B 7/085* (2006.01)
*G11B 17/22* (2006.01)

(52) U.S. Cl. .............................. 369/30.33; 369/30.06; 369/30.51

(58) Field of Classification Search ............. 369/30.52, 369/30.77, 30.5, 30.62, 30.33, 30.55, 30.57, 369/30.63, 30.64, 30.59, 30.06, 36.01, 191.1, 369/192.1, 178.01
See application file for complete search history.

(56) References Cited

U.S. PATENT DOCUMENTS

| 5,319,621 | A | 6/1994 | Amar |
| 5,431,520 | A | 7/1995 | Brugger |
| 5,966,365 | A | 10/1999 | Schumacher |
| 6,072,766 | A | 6/2000 | Konshak |
| 6,075,758 | A | 6/2000 | Wu |
| 6,621,769 | B1 * | 9/2003 | Ochi ........................ 369/30.33 |
| 6,714,490 | B1 * | 3/2004 | Ostwald ..................... 369/30.5 |
| 6,785,198 | B1 * | 8/2004 | Lee ......................... 369/30.33 |
| 6,829,117 | B1 * | 12/2004 | Taki et al. ...................... 360/69 |

OTHER PUBLICATIONS

"Multi-Independent Trays Carousel", IBM Technical Disclosure Bulletin, vol. 37, No. 05, May 1994, pp. 417-418.
"Disk Input/Output Station for Rotating Tray Carousel", IBM Technical Disclosure Bulletin, vol. 37, No. 05, May 1994, pp. 155-157.

* cited by examiner

*Primary Examiner*—Ali Neyzari
(74) *Attorney, Agent, or Firm*—Schmeiser, Olsen & Watts

(57) ABSTRACT

The system comprises one or more storage devices (34) for storing data media, particularly CDs, a read/writer (50), a picking and transfer device (42), a series of rotary platters (22) stacked one on top of the other and each associated with a drive device (60, 62) acting on the periphery of platters to rotate these between a position in which the disks are stored and a position in which the disks can be accessed. Each platter has a slot (28) and when all the platters (22) are in the storage position, the slots (28) define an open channel which allows the transfer device (42) to move vertically.

9 Claims, 7 Drawing Sheets

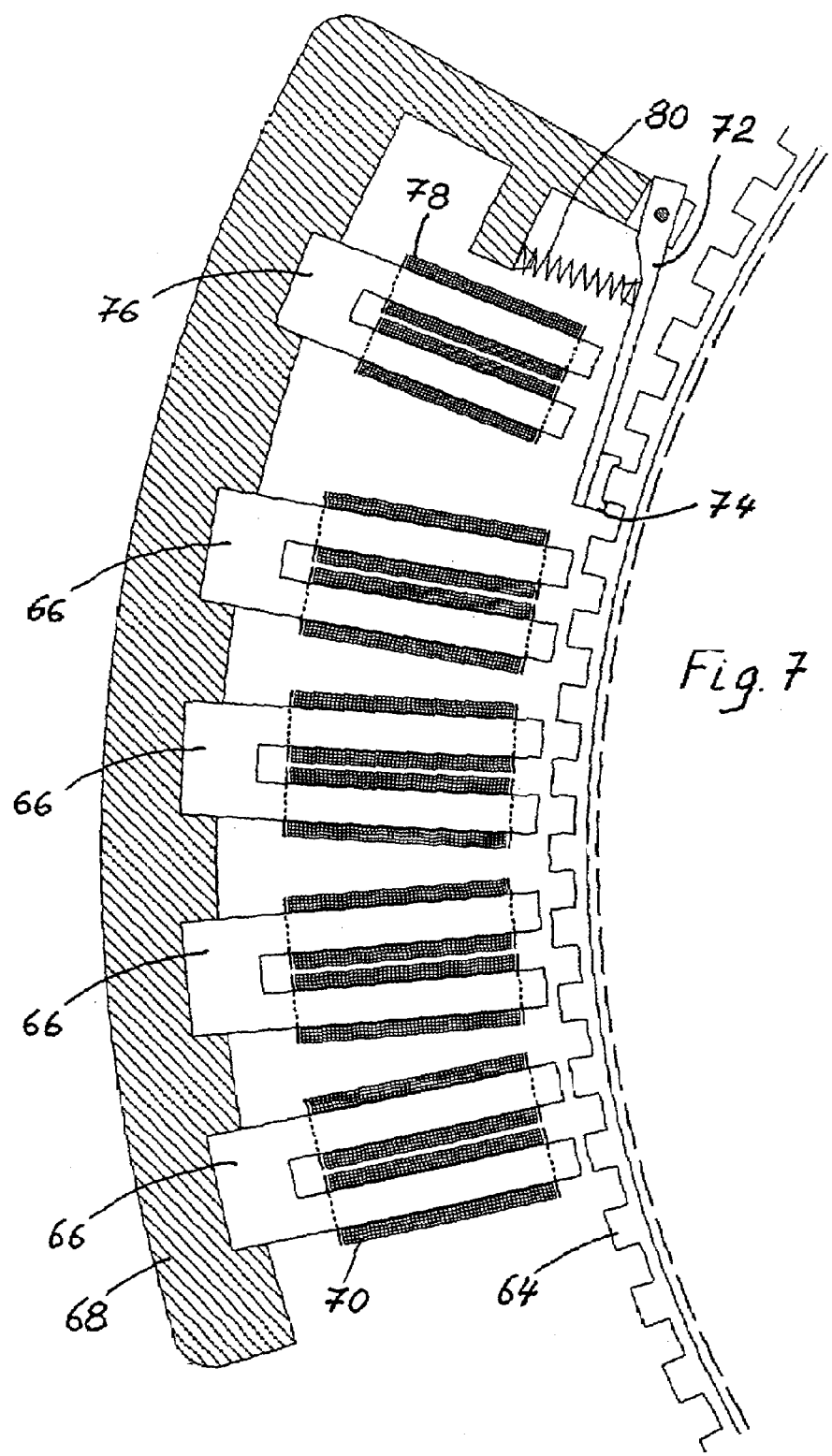

MEDIA STORAGE SYSTEM

The present invention relates to a system for storing data media with automatic access to each of the data media, comprising at least one storage device for storing the data media, a read/writer of the data media, a picking and transfer device for transferring each data medium separately between the storage device and the read/writer, or vice versa, in which each storage device comprises a series of rotary support platters stacked one on top of the other which are carried by a vertical central column and which can be rotated separately using an appropriate drive device acting on the periphery of each of the support platters to rotate these between a storage position and an access position, in which each support platter comprises a series of storage spaces, closed toward the outside in a horizontal plane, to accommodate the data media, and an opening arranged with the storage spaces in a concentric circle around the central column, the arrangement being such that when all the support platters are in their storage position their openings are vertically aligned one on top of the other to define an open channel.

These systems are used to store large quantities of data, particularly CDs, in the case of decentralized management of disks where the user and his workstation are geographically removed from this data storage and management center. In fact it constitutes a disk or video library, with automatic and random access to each individual disk, that needs to allow a great many remote users or customers to transfer, in a short space of time and by remote control, a selected CD from its storage space into one of the numerous pieces of equipment in the read/writer.

One of the criteria measuring the quality of such a system is the speed of access to the CDs and of their transfer to the read/writer. However, the greater the storage capacity of the system, the more problematic this speed of access becomes.

The IBM Technical Disclosure Bulletin, Vol. 37, No. 5, May 1994, New York, US, pages 155–158: "Disk input/output station for rotation carousel" describes a jukebox consisting of support platters stacked one on top of the other and able to rotate separately. Each support platter has, on a concentric circular line, a certain number of storage spaces and a disk opening.

The storage spaces on the platters each have a cut-out aligned vertically and which in the support platter extend radially outward. When the storage spaces and the openings of all the support platters are positioned one on top of the other, a horizontal disk picker arm can enter the storage spaces and openings from the outside of the support platters and move vertically throughout the jukebox.

Given that the platters have to have radial openings, the platter drive device needs to be arranged at the center and needs to be moved vertically in order to be able to be engaged with the various platters. This does, however, lead to a loss of time. An additional loss of time is caused by the design of the disk transfer device. What actually happens is that when a CD is being set in place this CD needs to be lifted up above its support platter before this platter can be turned into the desired position. Likewise, when extracting a CD, the CD has first of all to be lifted up by the transfer device before the support platter can be turned into the correct position for removal from the vertical well.

Document EP 0 722 168 proposes a system of the kind described in the preamble, the storage capacity and speed of execution of which are markedly improved over the system described in the aforesaid document. In document EP 0 722 168, the storage spaces in which the CDs are stored on the support platters are radially closed, allowing the platters to be driven from their periphery, and making it possible to provide a separate drive system for each support platter. However, this system also gradually reaches the storage capacity limits when its height is increased. This is because given that the access well is radially closed and that the reader is above the system, the picking and transfer device needs to move vertically through the well which may lengthen the time taken to access the disks, particularly the bottom disks, when the platter stack height increases. The picking and transfer system may also be subjected to vibrations as the height increases.

The object of the present invention is to provide a storage system of the kind described in the preamble with a large storage capacity and a high speed of access to the disks.

To achieve this objective, the present invention anticipates a storage system that has the characteristics of claim 1. Other particulars and characteristics of the invention can be found in the sub-claims.

The storage system proposed by the present invention has all the advantages offered by the system proposed in document EP 0 722 168. Furthermore, it offers the additional advantage of a higher speed at which orders are executed and a practically unlimited heightwise storage capacity. This is because given that the read/writer lies beside the storage device(s), the device for picking and transferring the data media no longer has to move up to the top of the device in order to deposit a data medium in the read/writer or remove it therefrom. Furthermore, given that, according to one preferred embodiment of the invention, the read/writer consists of a stack of individual read/writers which can be stacked over the entire height of the system, the picking and transfer device can choose the first read/writer whose loading bay is empty.

Furthermore, when the storage system extends over a relatively great height, it is possible to provide several picking and transfer devices spread over the entire height of the device, thus further increasing the speed of execution.

Further advantages and specifics of the invention will become apparent from reading about an advantageous embodiment set out hereinbelow by way of illustration with reference to the attached figures in which.

Figure 2:
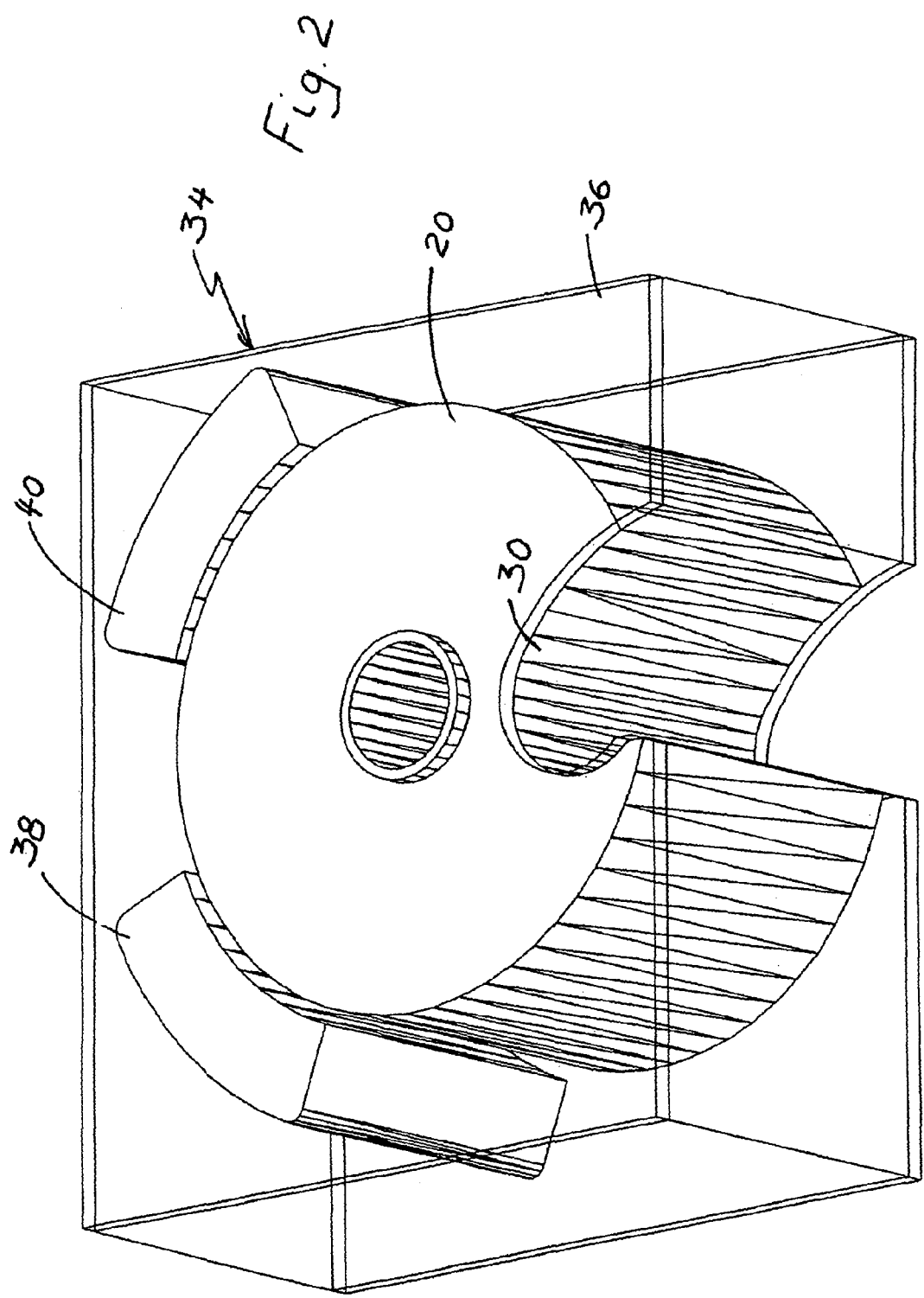
FIG. 2 shows, schematically and in perspective, a storage device according to the invention.
Figure 3:
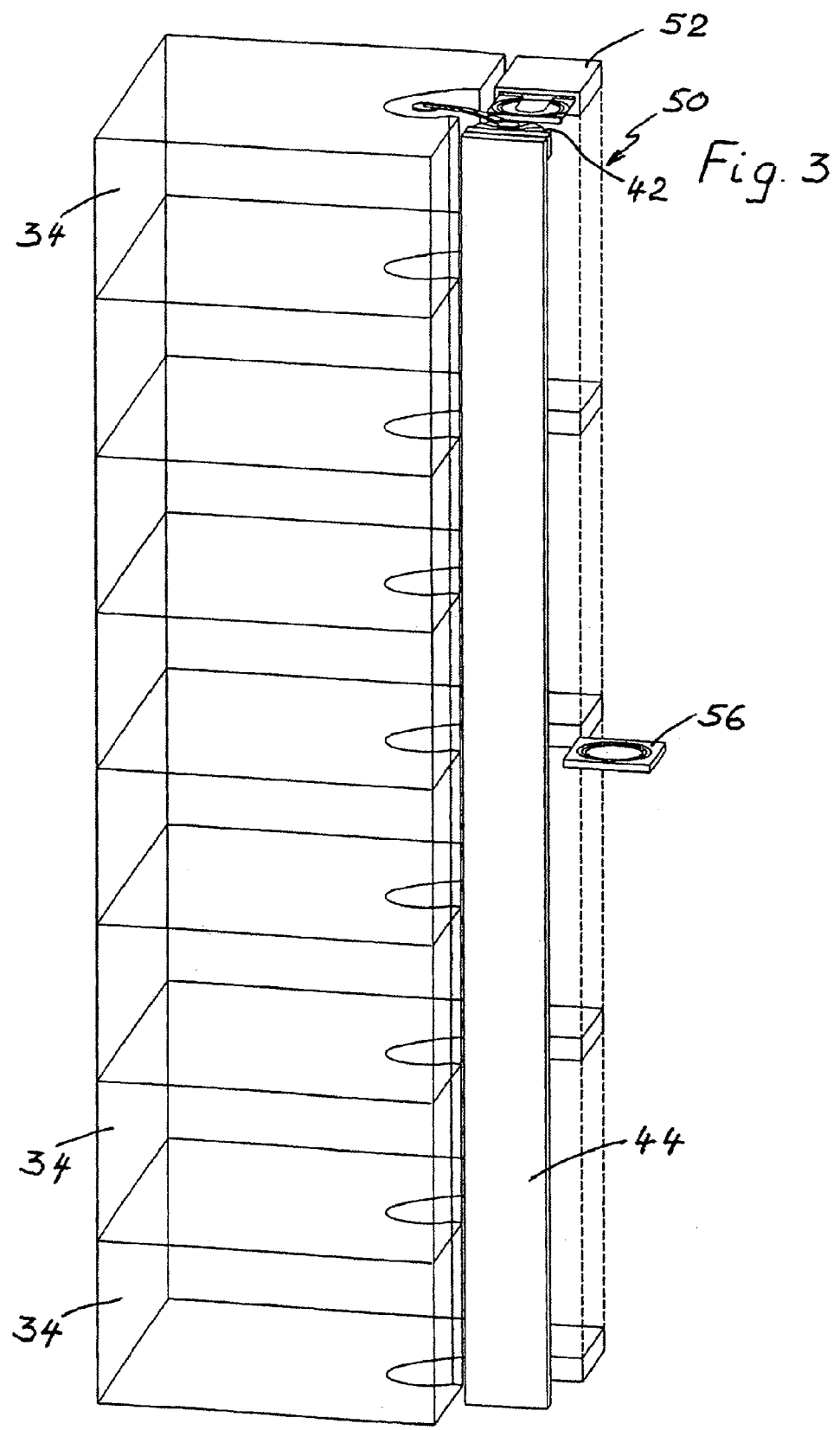

FIG. 3 schematically shows several devices according to FIG. 2 stacked one on top of the other.

Figure 4:
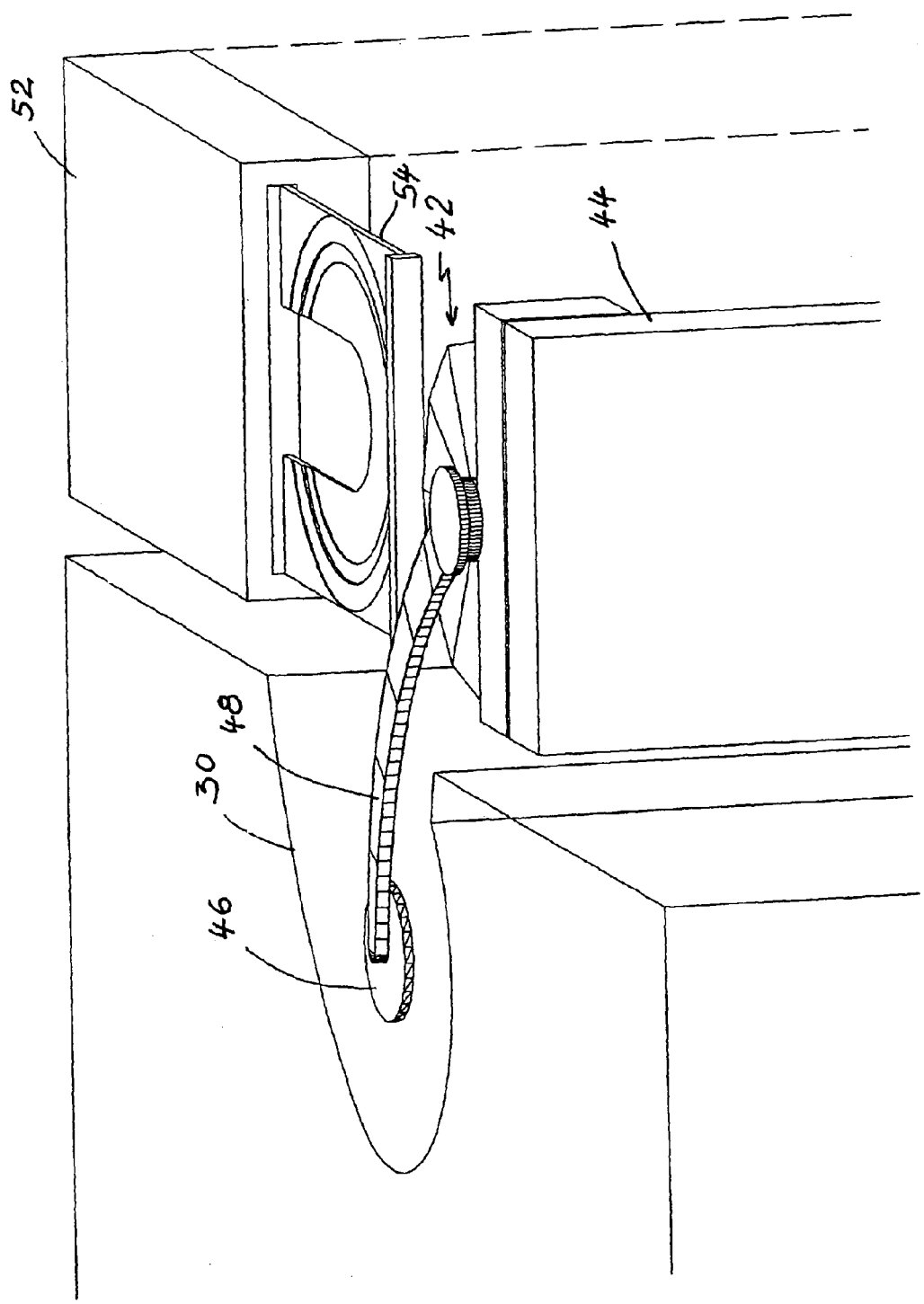

FIG. 4 shows, in greater detail, part of the top of the depiction of FIG. 3.

Figure 5:
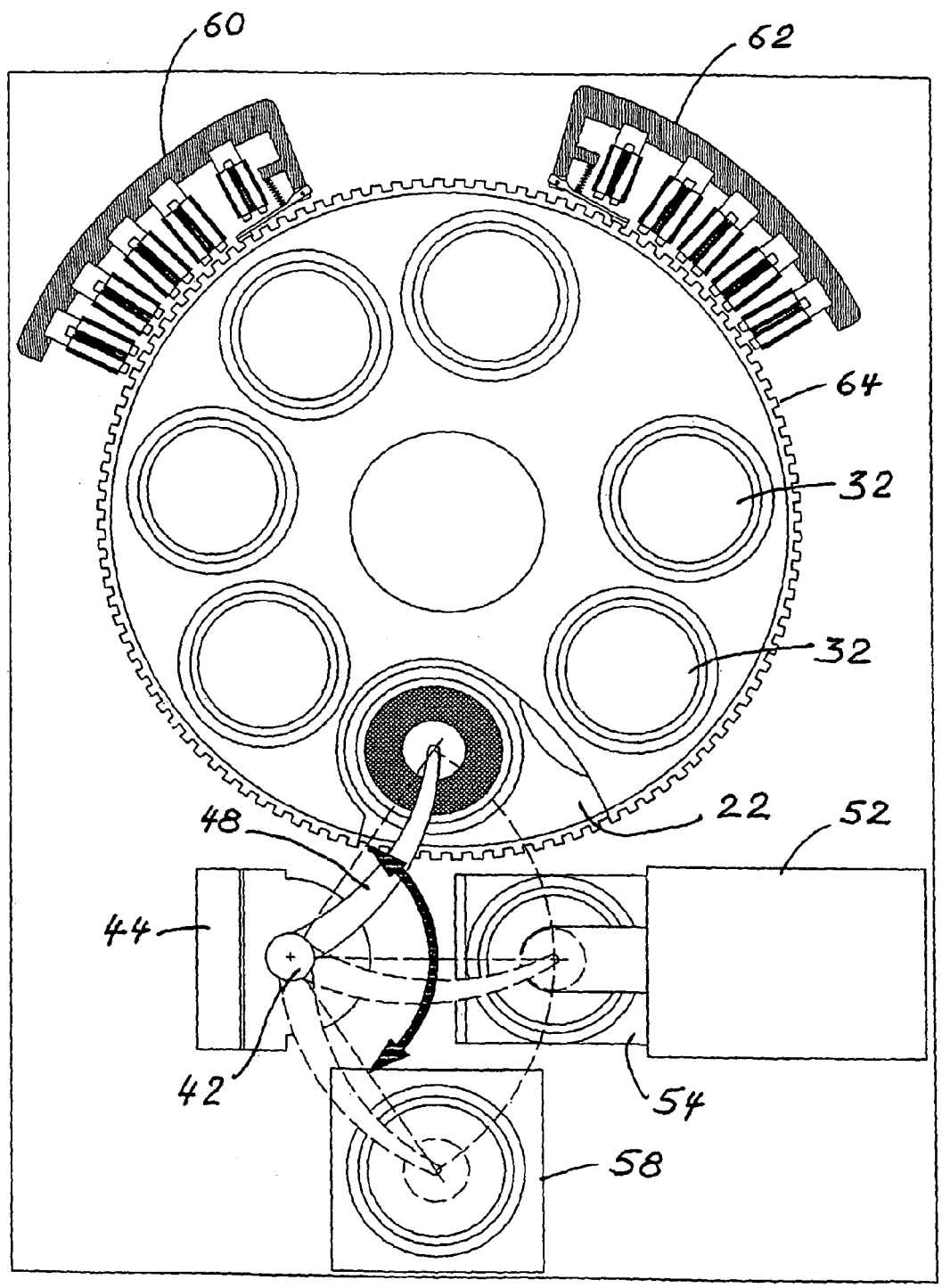

FIG. 5 schematically shows a view downwards on a storage device.

Figure 6A:
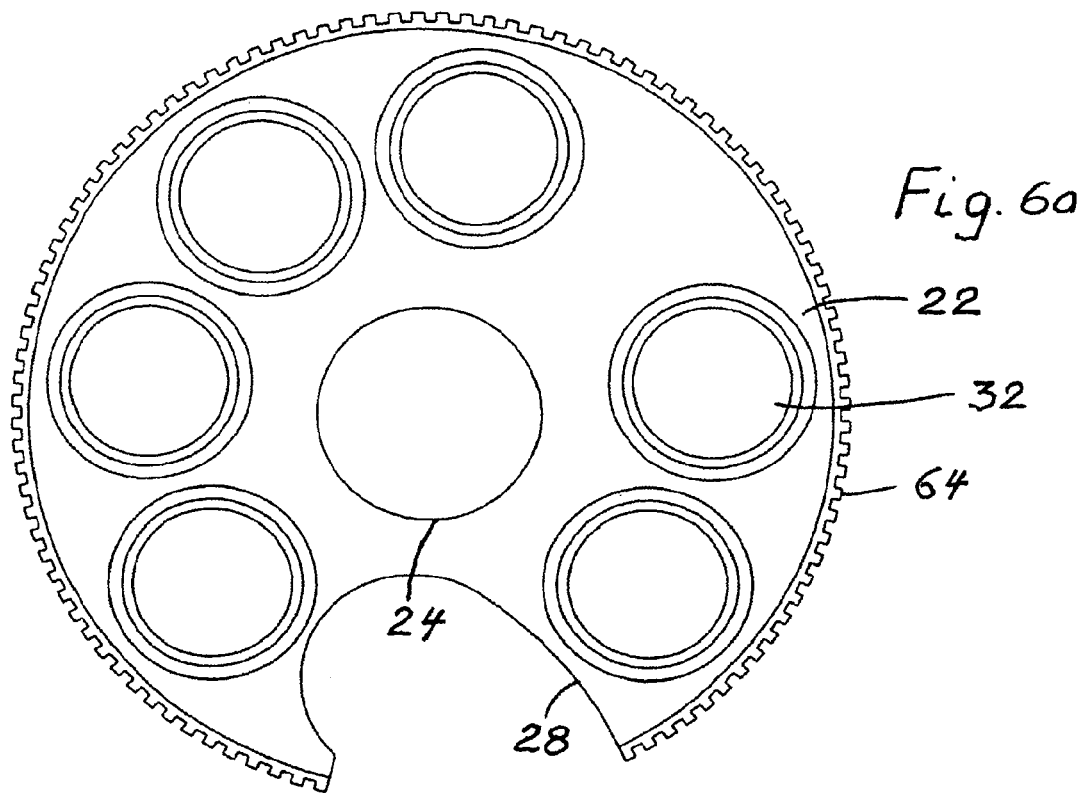
Figure 6B:
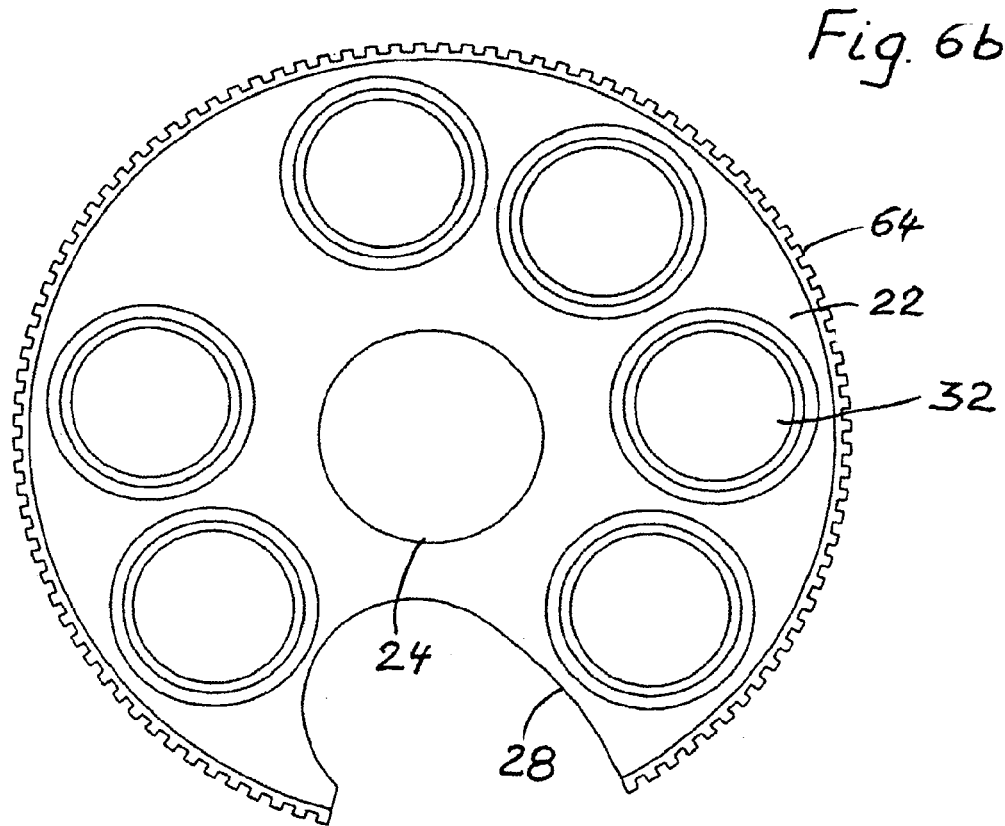

FIGS. 6a and 6b show a pair of support platters and

FIG. 7 schematically shows the details of a platter drive device.

The detailed description which will follow will make reference, by way of illustration, to a system for storing CDs. The invention may, however, also be applied to other types of data medium.

Figure 1:
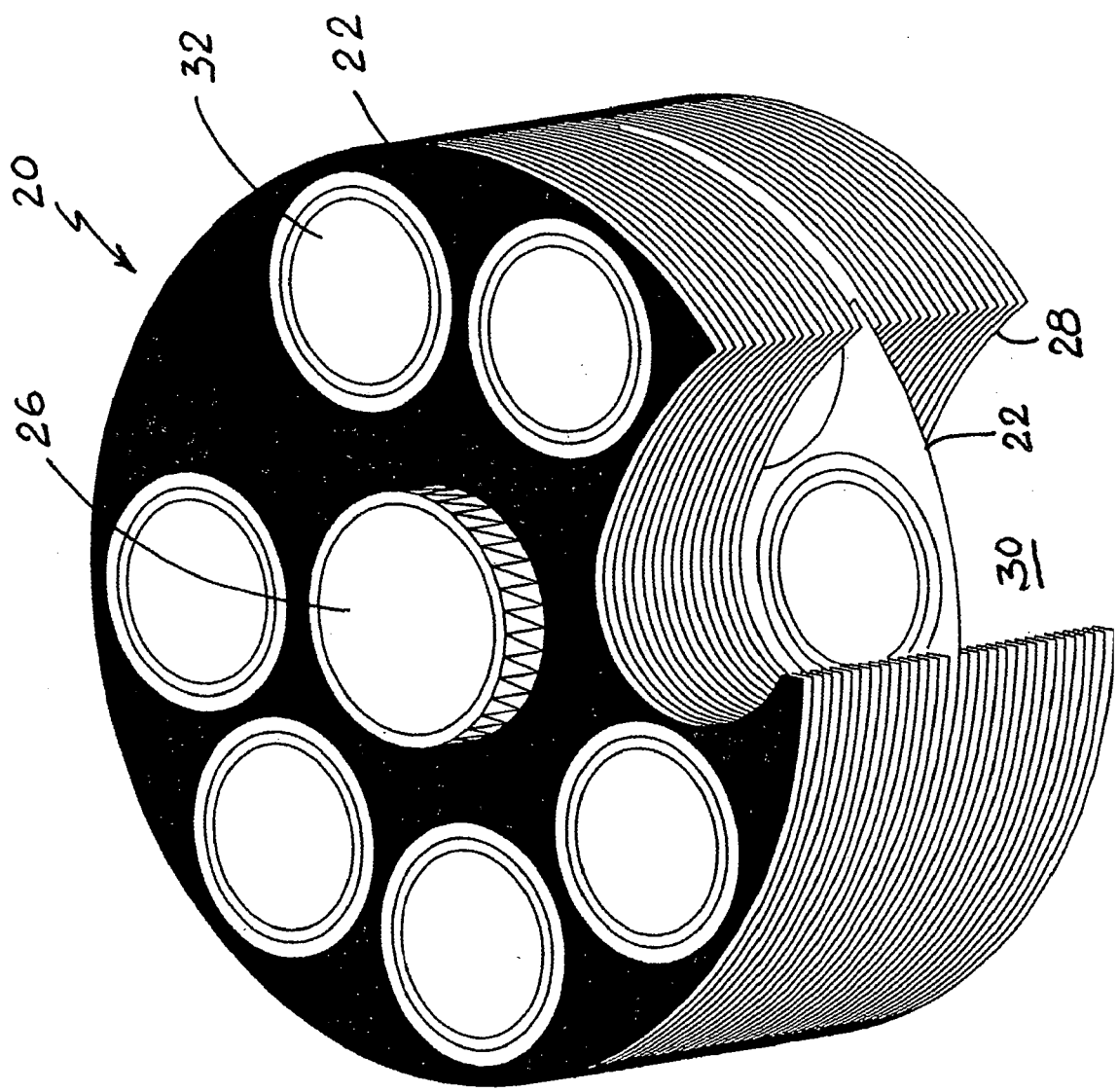
FIG. 1 depicts a perspective view of a stack of support platters for a CD storage device.

FIG. 1 shows a perspective view of a jukebox 20 according to the present invention. This jukebox consists of a certain number, in the example depicted of thirty-two, circular support platters 22 stacked one on top of the other and provided with a round central opening 24 (see also FIGS. 6a and 6b). The stack is carried by a central column 26 which extends axially through the openings 24 of the individual platters.

Each platter 22 comprises a slot 28 with a circular end wall and a width greater than the diameter of the CDs. This slot 28 opens in an arc of a circle into the peripheral edge of the platter 22. All the platters 22 can rotate individually around the column 26. Assigned to each platter 22, in the direction of rotation, is a storage position such that, when all the platters 22 are in their storage positions, the individual slots 28 are aligned axially and form a radially open channel 30 extending over the entire height of the jukebox. When the platter is rotated, as shown in FIG. 1, away from its storage position, its surface concerned becomes accessible, through the channel 30, to a picking device described in greater detail later on.

As can be seen in FIG. 1 and in FIGS. 6a and 6b, each platter 22 comprises, apart from the central opening 24 and the slot 28, a certain number, in the example depicted six, of circular storage spaces 32 for depositing and storing six CDs. The storage spaces 32 and the circular end wall of the slot are arranged in a ring around the central opening 24 so that as the platters 22 rotate, the storage spaces 32 each pass, one after the other, across the channel 30. If the individual platters 22 rotate far enough there is therefore freedom to access the individual platters 22 and each of their storage spaces 32, and the CDs contained therein. As can be seen from FIGS. 1 and 6, the storage spaces 32 are arranged in two groups, one of four and one of two, spaces 32. The reason for this arrangement will be explained later on.

The dimensions of the platters 22 and the number of solid spaces 32 on each platter 22, and the number of platters 32 stacked one on top of the other can be tailored to the individual requirements of each company. In the case of 32 platters each having six storage spaces 32, the jukebox depicted in FIG. 1 has a capacity of 192 CDs. It is also conceivable to anticipate larger platters 22 having more than six storage spaces 32.

The individual platters may be made of a synthetic substance or of metal, preferably of aluminum.

After the manner of document EP 0 722 168, the platters have a dinner-plate profile and they are mounted on the central column 26 in exactly the same way as they were in that document. The shape of the platters and their mounting on the column 26 will not therefore be described in detail in the context of this patent application and the reader should refer to document EP 0 722 168, particularly FIG. 3 thereof, for further information on this subject.

FIG. 2 schematically illustrates a storage device 34 comprising a jukebox 20 contained in a casing 36 with a lateral opening providing access to the channel 30. The jukebox 20 is associated with a pair of drive systems 38, 40 for driving the platters, which extend over the entire height of the jukebox 20 and will be described in greater detail later on.

FIG. 3 shows that it is possible to stack several storage devices 34 of FIG. 2 one on top of the other in order thus to form a high-capacity storage tower. FIG. 3 schematically shows a picking and transfer device 42 visible in greater detail in FIG. 4 and which slides along a vertical rail 44 stretching over the entire height of the tower. This vertical movement can be afforded by any means known per se such as an endless screw, a belt, a cable, etc. Depending on the height of the tower it is possible to provide several picking and transfer devices sliding along the rail 44.

Each picking and transfer device 42 comprises a pivoting picking arm 48 at the end of which there is a pneumatically operated suction cup or some other device able to pick and transport a CD. Because of the pivoting movement of the picking arm 48, the slots 28 of the platters 22 defining the channel 30 do not run radially in the platters 22 but in an arc of a circle conforming to the radius of pivoting of the suction cup 46.

The reference 50 in FIG. 3 schematically denotes the CD read/writer. The read/writer 50 may consist of common individual read/writers 52, possibly slightly adapted, stacked one on top of the other to form a tower facing the rail 44. A reader must be understood to mean a piece of equipment containing either readers or writers or both, or alternatively items of equipment able both to read and to write. As FIG. 4 shows, each piece of equipment comprises a retractable bay 54 able to accommodate a CD. When the bay 54 is free, the center of its accommodating area is in the radius of action of the picking arm 48 and its suction cup 46.

When a remote user wishes to consult a given CD he orders this remotely and this unlocks the platter 22 bearing this disk from its storage position in which the slot 28 is aligned with the channel. The platter 22 is then rotated in one direction or the other, depending on which storage space 32 bears the requested disk, to bring this storage space and the disk into the channel 30. During this time, the picking device 42 is lowered automatically while the arm 48 pivots in the channel 30 into the position of FIG. 4. In close proximity to the requested disk the picking device is halted while the suction cup 46 is actuated to pick up the requested disk. The device 42 is then raised back up along the rail 44 as far as the first free read/writer 52. During this time, the platter 22 which has supplied the disk returns to its storage position to free up the channel 30. At the read/writer 52, the arm 48 is pivoted so that the suction cup 46 can set the disk down in the free bay 54 of the read/writer. A disk is returned to its storage platter following the reverse pattern of events.

The various drives and movements are controlled automatically by a central computer, which means that all the movements are coordinated with each other.

The reference 56 in FIG. 3 schematically illustrates a cassette with a disk intended to be set in place or to replace another disk in the storage device.

This loading or replacement may be performed by hand by an operator who offers the disk 56 up to the suction cup 46 and commands its setting-down at a chosen location of the device using the above scenario.

This operation may also be performed automatically using a tower cabinet 58 (FIG. 5) in which the disks to be loaded into the storage device are stacked and which lies facing the channel 30. The picking device 42 can then automatically find the disks from the cabinet 58 under the control of an operator.

FIG. 5 shows a view looking down on a storage device in which the transfer and picking device, depicted in solid line is in the process of picking a disk from a platter 22 or of setting it down thereon. The pivoting range of the picking arm 48 is illustrated by the arrow. This arm 48 is also depicted, in broken line, in a position in which it is serving the reader 52 and in a position in which it is serving itself from the cabinet 58.

FIG. 5 also shows two devices 60 and 62 for driving the platters 22. Associated with each of the platters 22 is such a device 60 and 62 which devices are arranged in two groups over the entire height of the device. This is because, like in document EP 0 722 168, because of the thinness of the support platters and the very small vertical spacing between them, it is preferable to provide two drive groups, one comprising the drive motors for the even-numbered support platters and the other comprising those for the odd-numbered support platters.

As in the storage device known from the aforesaid document, each support platter 22 is provided at it periphery with an annulus gear 64 made of magnetic soft iron (see also FIGS. 6a and 6b) intended to collaborate with the drive devices 60, 62 with a view to rotating and locking the platters 22.

However, unlike the storage device in which the annulus gears extend around the entire periphery of the platters and have no interruption for drive and locking, the annulus gears 64 of the platters 22 according to the present invention have necessarily to be interrupted at the slots 28, which means that each platter 22 can rotate only to such a point that its slot 28 reaches the drive device for the platter concerned. To solve the problem, all the drive devices are designed to turn their platter 22 in both directions. The consequence is that each platter 22 has a space which is lost as a storage space given that this space corresponds to the position where the slot would lie virtually facing the drive device for this plate and that as a result, this space cannot be rotated into an angular position that blocks off the channel. This is why the storage spaces 32 of each platter 22 are grouped in a set of four and a set of two and that there is this dead space between these two groups.

Another consequence is that two types of platter 22 are needed, one for the drive devices 60 and the other for the drive devices 62. In concrete terms, the platter of FIG. 6a will be actuated by the drive device 60 located to the left in FIG. 5 and the platter of FIG. 6b will be actuated by the device 62. The drive device 60 will rotate the platter 22 of FIG. 6a in the clockwise direction to bring the group of two storage spaces 32 into the position of obstructing the channel 30. By contrast, in order to bring the group of four storage spaces 32 into a position of obstructing the channel 30, the platter 22 will be rotated in the trigonometrical direction. In the case of the platter of FIG. 6b, which is actuated by the drive device 62, the reverse is true.

The devices for driving the platters 22 are similar to those of the device known from document E 0 722 168. FIG. 7 shows an advantageous exemplary embodiment of a drive device for rotating the associated support platter about the column 26. The support platter is indicated in FIG. 7 via its peripheral annulus gear 64. Drive is had by a pseudo-linear stepping motor known per se. Facing the annulus gear 64 there are four magnet armatures 66 which are fixed to a support rail 68 extending along the stack of platters. Associated with the two limbs of each magnet armature 66 are two adjacent teeth of the annulus gear 64 of a support platter. Each limb of the four magnet armatures carries a winding 70 which is powered with direct current by an electric circuit known per se and not depicted. Through sequential cyclic switching of the excitation of the windings, each tooth of the annulus gear 64 is attracted by the alternating magnetic field of one magnet limb toward the other and from one magnet armature 66 to the next, causing the annulus gear 64, to rotate and to thus form the rotor of the stepping motor. The disks are accelerated and braked also using the stepping motor.

In order to ensure correct positioning of each support platter 22 in a storage position or in one of the six access positions, i.e. the positions in which the storage space obstructs the channel 30, a locking position is assigned to each storage space 32 and to the slot 28 of each platter. For this purpose, a locking device is associated with each platter and built into the corresponding drive device.

As FIG. 7 shows, the locking device consists of a soft iron lever 72 mounted to pivot on the support rail 68 and the free end of which is provided with a head 74 in the form of a hollow dish having a shape that complements that of a tooth of the annulus gear 64. This lever is associated with a magnet armature 76 fixed to the support rail 68, the two limbs of which armature bear an excitation winding 78 powered with direct current by an appropriate electric circuit, not depicted. The lever 72 also experiences the action of a compression spring 80 attached to the rail 68. When the winding 78 is not excited, the lever 72 is pushed by the spring 80 into a position of engagement with the tooth, as in FIG. 7, i.e. the platter is locked. When the winding is excited, the lever 72 is attracted against the action of the spring and frees the platter.

The control of the excitation winding 78 is of course synchronized with the drive device so that each time the driving of a platter is actuated, the platter is automatically unlocked by excitation of the winding 78.

The systems for driving and locking the platters are under the control of sensors, not shown, sensing the angular positions of the platters. These sensors are advantageously sensors sensitive to the passage and progress of the individual teeth of the annulus gears 64 past them.

The invention claimed is:

1. A system for storing data media with automatic access to each of the data media, comprising at least one storage device for storing the data media, a read/writer of the data media, a picking and transfer device for transferring each data medium separately between the storage device and the read/writer, or vice versa, in which each storage device comprises a series of rotary support platters stacked one on top of the other which are carried by a vertical column and which can be rotated separately using an appropriate drive device acting on the periphery of each of the support platters to rotate these between a storage position and an access position, in which each support platter comprises a series of storage spaces, closed toward the outside in a horizontal plane, to accommodate the data media, and an opening arranged with the storage spaces in a concentric circle around the central column, the arrangement being such that when all the support platters are in their storage position their openings are vertically aligned one on top of the other to define an open channel in which the openings of the support platters are slots with a diameter greater than that of the data media and open to the periphery of the platters and in which the drive devices for driving the platters are designed to cause the platters to rotate in both directions, characterized in that the read/writer and the picking and transfer device are situated near the open channel defined by the slots in the platters, in that the read/writer is a unit independent of the storage system and comprises a multiplicity of individual readers and/or writers stacked one on top of the other near the picking and transfer device, and in that the latter is designed to slide along the open channel defined by the slots.

2. The storage system as claimed in claim 1, characterized in that the picking and transfer device comprises at least one pivoting arm bearing at its free end a picker for picking the data media and able to slide along a vertical rail stretching over the entire height of the storage system.

3. The storage system as claimed in claim 1, characterized in that each platter is associated with a separate drive device and in that the drive devices are arranged in two groups one associated with the even-numbered support platters and the other with the odd-numbered support platters.

4. The storage system as claimed in claim 3, characterized in that each drive device consists of a pseudo-linear stepping motor and in that each support platter comprises a peripheral annulus gear made of magnetic soft iron forming the rotor of the stepping motor.

5. The storage system as claimed in claim 1, characterized in that each support platter has six circular storage spaces.

6. The storage system as claimed in claim 5, characterized in that the six storage spaces of each platter are arranged in two groups, of four and of two, storage spaces which are arranged one group on each side of the slot in their platter and in that this platter is turned in a first direction to transfer the storage spaces of the group of four from the storage position to the access position and in the opposite direction to transfer the storage spaces of the group of two from the storage position to the access position.

7. The storage system as claimed in claim 1, characterized by a locking device for locking in the storage position and in the access position.

8. The storage system as claimed in claim 7, characterized in that each platter is associated with a locking device consisting of a pivoting lever the free end of which bears a head that can be engaged in a tooth of the annulus gear under the action of a spring and from which it is disengaged under the action of an electromagnet.

9. The storage system as claimed in claim 1, characterized in that each storage device is contained in a casing with a lateral opening giving access to the channel, and in that the system comprises several storage devices stacked one on top of the other.

* * * * *